Jan. 29, 1935.  F. C. FRANK  1,989,189

WHEEL

Filed Aug. 19, 1932

INVENTOR.
Frederick C. Frank
BY
*J. P. Keiper*
ATTORNEY.

UNITED STATES PATENT OFFICE 1,989,189

WHEEL

Frederick C. Frank, South Bend, Ind., assignor to Bendix Aviation Corporation, South Bend, Ind., a corporation of Delaware Application August 19, 1932, Serial No. 629,515

2 Claims. (Cl. 301—5)

This invention relates to grooved wheels wherein means are provided for gaining access to the groove, and is illustrated as embodied in a wheel for a pneumatic tire.

Wheels, in general, which are adapted to carry pneumatic tires are provided with a grooved portion with relatively high flanges on either side which ordinarily prevent the easy removal of the tire, and in the case of a small diameter balloon type tire such as used in aircraft, it is essential that some means be provided whereby one flange may be removed without difficulty and danger to the tire since the tire casing cannot be stretched sufficiently to clear the flange.

It is accordingly an object of this invention to provide a novel grooved wheel having a pair of complementary sections adapted to part on a plane passing through the grooved portion.

A further object of the invention is the provision of a wheel having complementary sections which may be readily parted and secured rigidly together on a plane perpendicular to the wheel axis.

A still further object is the provision of a bayonet type joint for detachably securing a pair of complementary wheel sections together and a locking mechanism therefor to prevent unwarranted detaching.

The above and other novel features of the invention will appear more fully hereinafter from the following detailed description when taken in connection with the accompanying drawing. It is expressly understood, however, that the drawing is employed for purposes of illustration only and is not designed as a definition of the limits of the invention, reference being had for this purpose to the appended claims.

In the drawing, wherein similar reference characters refer to similar parts throughout the several views.

Figure 1:
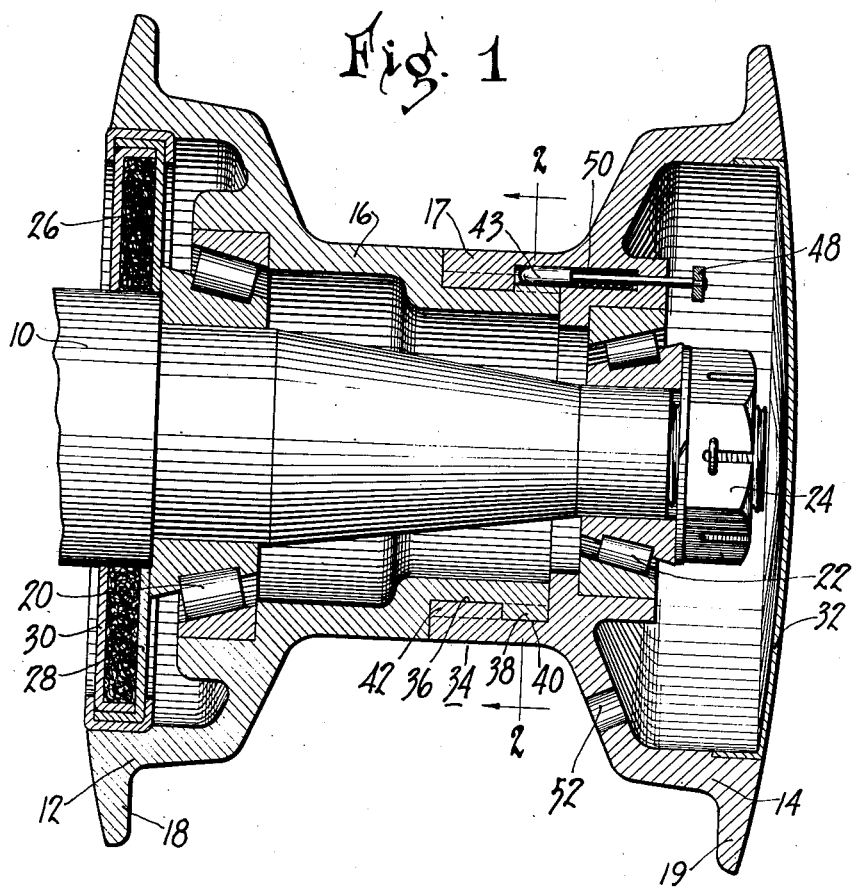
Figure 1 is a side elevation of a wheel section taken on a plane passing through the axis thereof showing the complementary parts in assembled relation.
Figure 2:
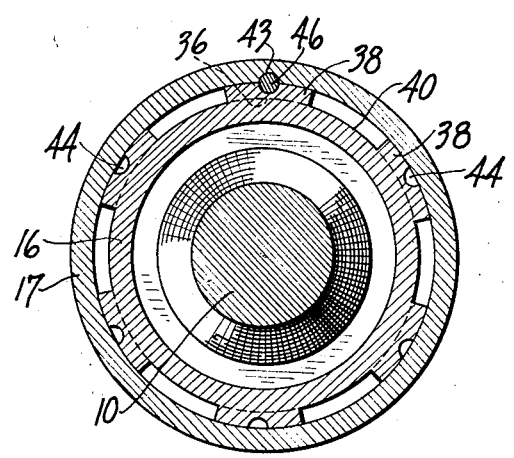
Figure 2 is a section taken on the line 2—2 of Figure 1 illustrating a preferred form of locking mechanism.

Referring more particularly to the drawing and more particularly to Figure 1 thereof, there will be seen illustrated a wheel of the airplane type mounted on an axle 10 and composed generally of a pair of complementary parts or members 12 and 14. Each of the complementary parts is preferably provided with groove portions 16 and 17, flanged portions 18 and 19, and anti-friction bearings 20 and 22, as shown which are mounted upon the axle and secured in place by the nut 24. To retain the grease or other lubricant within the bearing, a felt packing 26 secured by retainers 28 and 30 is provided in the member 12, while a suitable cover and stream line cap 32 is inserted in the wheel member 14.

In order to detachably secure the members 12 and 14 together, so that placing of a tire thereon may be easily accomplished, the section 14 is adapted to telescope the section 12 as illustrated at 34. As shown, the groove section 16 of the member 12, is provided with a reduced diameter portion having an annular recess 36 located between the tire groove and an interrupted flange 38, while the complementary member 14 is provided with an internal annular recess 40, and an interrupted internal flange 42. The notches formed by the interrupted flange 42 and flange 38 are arranged so that the one flange may readily slide past the other flange in the operation of assembling the members together, and the notches also are adapted to engage one another upon a slight rotation of one member relative to the other to prevent disassembly, much in the manner of a bayonet joint.

In order that the members may be locked together in a safe and secure manner, a spring pressed plunger 43 is provided in the member 14 which is adapted to operate as a key between the two members 12 and 14, fitting in one of the grooves 44 on the member 12 and the groove 46 in the member 14, so as to prevent relative rotation. A button 48 secured on one end of the plunger is adapted for manual operation to withdraw the plunger against the urge of the spring 50 when it is desired to disassemble or assemble the members.

In the use of a pneumatic tire, it is preferable to provide a suitable aperture 52 for a valve stem, which in this particular construction is best positioned in the member 14.

In the structure shown, to take the two sections apart, the nut 24 is first removed and after deflating the tire, if one be mounted in the groove, the plunger 43 is withdrawn, and one member 14 rotated with respect to the other member 12 until the flange notches 38 are in position to axially slide past one another, thus permitting the one member to be removed with respect to the other.

Though only one embodiment of the invention has been illustrated and described, it is to be understood that the invention is not limited thereto but may be embodied in various mechanical forms. For example, one of the members may carry both bearings thereby permitting disassembly without disturbing the axle nut and bearings. As many such changes in construction and arrangement of parts may be made without departing from the spirit of the invention, as will be apparent to those skilled in the art, reference will be had to the appended claims for a definition of the limits of the invention.

I claim:

1. A pneumatic tire wheel comprising two telescopic sections each having a cylindrical combined hub and rim portion, a tire flange on each section, a bearing on each section, bayonet means for holding said sections together by rotating one section relative to the other, said bayonet means including internal spaced segments on one section and external spaced segments on the other section adapted to slide by one another and be rotated relative thereto for holding the sections together, and a locking means comprising a spring pressed plunger arranged parallel to the wheel axis in one section adapted to slidably fit in a keyway partly formed in one of said segments of the other section and an adjacent portion of the plunger carrying section.

2. A wheel comprising two telescopic sections each having a cylindrical combined hub and rim portion, bayonet means for holding said sections together by rotating one section relative to the other, said bayonet means including internal spaced segments on one section and external spaced segments on the other section adapted to slide by one another and be rotated relative thereto for holding the sections together, and a locking means comprising a slidable key arranged parallel to the wheel axis in one section adapted to slidably fit in a keyway partly formed in one of said segments of the other section and an adjacent portion of the slidable key carrying section.

FREDERICK C. FRANK.